(12) United States Patent
Ackermann (10) Patent No.: US 6,935,540 B2
(45) Date of Patent: *Aug. 30, 2005

(54) DISPENSER ASSEMBLY FOR A FRAGRANCE OR PERSONAL CARE BOTTLE AND A METHOD OF ASSEMBLING SAME

(75) Inventor: Walter Ackermann, Watertown, CT (US)

(73) Assignee: EMSAR, Incorporated, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/865,588

(22) Filed: Jun. 9, 2004

(65) Prior Publication Data

US 2004/0222242 A1 Nov. 11, 2004

Related U.S. Application Data

(63) Continuation of application No. 10/293,692, filed on Nov. 13, 2002, now Pat. No. 6,776,311.

(51) Int. Cl.[7] .............................................. B65D 88/54
(52) U.S. Cl. .............................. 222/321.7; 222/321.9; 222/153.09; 222/570; 215/274; 215/276; 220/319
(58) Field of Search .......................... 222/321.1–321.3, 222/321.7–321.9, 153.01, 153.09, 385, 562, 570; 215/272, 274, 275–276; 220/319–320

(56) References Cited

U.S. PATENT DOCUMENTS

| | | |
|---|---|---|
| 811,824 A | 2/1906 | Clay |
| 852,981 A | 5/1907 | Sautter |
| 1,386,742 A | 8/1921 | Taliaferro |
| 1,740,881 A | 12/1929 | Taliaferro |
| 2,723,773 A | 11/1955 | Greene |
| 4,676,407 A * | 6/1987 | Rideout ...................... 222/182 |
| 4,773,553 A | 9/1988 | Van Brocklin |
| 4,984,702 A | 1/1991 | Pierpont |
| 5,147,073 A * | 9/1992 | Cater ...................... 222/321.9 |
| 5,299,703 A | 4/1994 | Cater |
| 5,348,174 A | 9/1994 | Velicka |
| 5,562,219 A | 10/1996 | de Pous et al. |
| 5,642,908 A | 7/1997 | Mascitelli |
| 5,762,238 A * | 6/1998 | Liang ...................... 222/321.9 |
| 5,799,810 A | 9/1998 | de Pous et al. |
| 5,813,554 A | 9/1998 | Marangoni Graziani et al. |
| 5,941,428 A | 8/1999 | Behar et al. |
| 5,960,972 A | 10/1999 | Larguia, Sr. |
| 6,186,359 B1 | 2/2001 | de Pous et al. |
| 6,315,169 B1 | 11/2001 | de Rosa |
| 6,409,049 B1 | 6/2002 | de Pous et al. |
| 6,527,148 B2 | 3/2003 | de Rosa |
| 6,543,648 B2 | 4/2003 | de Pous et al. |
| 6,776,311 B2 * | 8/2004 | Ackermann .............. 222/321.7 |
| 2001/0048003 A1 | 12/2001 | Jourdin et al. |
| 2001/0054624 A1 | 12/2001 | Jourdin et al. |

\* cited by examiner

*Primary Examiner*—Frederick Nicolas
(74) *Attorney, Agent, or Firm*—Carmody & Torrance LLP (57) ABSTRACT

A dispenser assembly for dispensing a substance from a receptacle is provided. Preferably the collar therefore comprises outwardly projecting and elongated angled ribs for forming complementary elongated grooves in the outer surface of the ferrule. A method of assembling such a dispenser assembly upon a receptacle is also provided and comprises the important step of allowing the collar to rotate over the outer surface of the ferrule and towards the receptacle, such that the elongated ribs form complementary elongated grooves in the outer surface of the ferrule thereby forming an airtight seal between the dispensing assembly and the receptacle.

10 Claims, 7 Drawing Sheets

DISPENSER ASSEMBLY FOR A FRAGRANCE OR PERSONAL CARE BOTTLE AND A METHOD OF ASSEMBLING SAME

Continuation of application Ser. No. 10/293,692, filed Nov. 13, 2002, now U.S. Pat. No. 6,776,311

BACKGROUND OF THE INVENTION

The present invention relates generally to dispenser assemblies for receptacles such as fragrance or personal care bottles, and in particular, to an improved collar for use therewith that significantly reduces the likelihood that the dispenser assembly will inadvertently or undesirably become decoupled from the receptacle, without sacrificing the ease of which the collar can be initially positioned thereon. That is, the present invention is directed to an improved dispenser assembly that maximizes the "off-to-on" force of application and removal forces for the collar. An improved method of assembling the dispensing assembly on the receptacle is also provided.

Generally speaking, prior art fragrance and personal care pumps consist of a pump module, a manual actuator for operating the pump, a ferrule that contains the module and crimps onto the receptacle (i.e. glass or plastic container), a gasket that seals the ferrule to the top of the receptacle's neck and a decorative collar. A cap may also be provided over the collar either in a slip-fit or a snap-fit arrangement.

Typically, the pump is retained on the bottle by one of two methods:

(a) the lower edge of the ferrule, typically comprised of aluminum, is collapsed inwardly under the neck of the receptacle by a crimping tool. After mounting, the collar is pushed over the ferrule as a separate operation; or (b) a ferrule, made of either plastic or metal, has its multiple legs folded under the neck of the receptacle by sliding the collar down the ferrule. The collar is partially preassembled to the ferrule at the pump manufacturer's plant and the assembly is then mounted on the bottle at the customer's plant in one operation.

In either case, the collar can be metal or plastic. Usually, retention of a plastic collar on the ferrule is not a major concern because designs incorporate snap fits or heavy press fits that do not compromise the outer aesthetics of the collar. However, metal collars are usually fabricated in aluminum and then anodized to produce a lustrous surface. In order to accommodate physical tolerances in the ferrule and collar diameters, the internal surface of the collar may contain multiple elongated vertical ribs (see FIGS. 1 and 1A) that project outwardly several thousandths of an inch off the inner surface thereof. When the collar is pushed over the ferrule with a heavy press fit, the collar slightly distorts, or "breathes," into a polygon, giving it a resiliency that deals with the tolerances. Another attribute of the ribs is to concentrate the "hoop" stress at multiple points, causing the ribs to dig into the ferrule and thus increasing the resistance to removal.

However, finding the optimal parameters that provide the best seal of the pump to the receptacle is difficult and heretofore has been elusive. For example, although the press fit over the ferrule must be large enough to assure that the collar cannot be accidentally pulled off the ferrule, it must be low enough to avoid damaging the outer surface of the collar. That is, the anodized surface of the collar is typically a very thin film of aluminum oxide that contains a colorant dye. When stressed in tension, the oxide film can crack, creating a diffraction grating that produces a rainbow effect, which detracts from the aesthetics. As a result, the rib locations become evident on the outer surface of the collar, a condition known as "crazing".

Similarly, while the press fit must be high enough to compress the gasket sufficiently to assure a seal to the bottle neck so as to avoid leaking, the press fit should not be so high as to over-compress the gasket, causing it to extrude out from under the ferrule, or creating such large forces that the bottle collapses or breaks.

Accordingly, it can be seen that improvements in the art are still desired. Specifically, it is desired to improve the state of the art collars to be able to increase the needed force to remove the collars while simultaneously not requiring so much force in initially applying the collar that crazing, bottle leaking or breaking occurs.

One such proposal that has been suggested is to provide spiraling ribs in the inner surface of the collar. One exemplary construction that appears to utilize spiral ribs is described in U.S. Pat. No. 5,799,810. However, it is believed that the descriptions and the resultant product therein are less than satisfactory and that still further improvements are achievable. Specifically, it is believed that the spiral ribs in this '810 patent are not provided to hold the collar on, but rather, to permit the collar to be unsecured after the contents of the receptacle have been used up, all for the purpose of recycling. Moreover, the '810 patent's inherent description of restricting any rotation of the collar as it is being fitted over the ferrule provides for less than satisfactory results. That is, and as further discussed below, the severe angle of the ribs in this prior art patent prevents rotation of the collar as it is being fitted on the ferrule, resulting in more of a "snowplow" type deformation of the plastic ferrule, and a less than satisfactory "off to on" ratio for the collar.

Accordingly, it is desirable to provide an improved dispensing assembly that further advances the state of the art. In particular the present invention seeks to reduce the required application force so as to avoid collar crazing while simultaneously providing for (a) sufficient gasket compression without extrusion, (b) a desirable amount of required removal force, and (c) an increase in the ratio of axial collar removal force to application force. The present invention achieves these as well as the below mentioned objectives.

SUMMARY OF THE INVENTION

Generally speaking, in accordance with the present invention, a dispenser assembly for dispensing a substance from a receptacle is provided. In a preferred embodiment, the dispenser assembly comprises a pump assembly that comprises at least an exit tube through which the liquid leaves the pump assembly and a dip tube, coupled to the exit tube and extending into the receptacle, for transporting liquid from the receptacle towards the exit tube; a metal ferrule for maintaining a coupling of the pump assembly to the receptacle, the ferrule comprising an outer surface and an interior cavity, an aperture through which at least the exit tube of the pump assembly extends, and a plurality of bendable and depending legs for engaging the rim of the receptacle; a gasket, positioned in the interior cavity of the ferrule and having an opening through which the pumping assembly is positioned, the gasket for maintaining an airtight seal between the pumping assembly and the receptacle; and an annular collar, the collar having an inner surface and an outer surface, the inner surface comprising outwardly (when viewed from the inner surface, not from the longitudinal axis of the collar) projecting elongated ribs, the ribs extending along the inner surface thereof and non-orthogonally to a longitudinal axis of the collar; wherein the ribs are angled along the inner surface of the collar so that the collar is caused or otherwise allowed to rotate along the outer surface of the ferrule as the collar is pressed towards the receptacle and the elongated ribs form complementary elongated grooves in the outer surface of the ferrule as the collar is being fitted thereon; wherein the plurality of depending legs are locked in engagement with the rim of the receptacle to maintain the coupling of the ferrule with the receptacle; whereby an airtight seal is provided between the dispensing assembly and the receptacle when the collar is positioned over the ferrule and the collar secures the engagement of the legs with the rim of the receptacle.

A method of assembling such a dispenser assembly upon a receptacle is also provided and comprises the steps of providing a collar such as that disclosed above and pushing the collar towards the receptacle and causing it to rotate over the outer surface of the ferrule as it is forced towards the receptacle, such that the elongated ribs form complementary elongated grooves in the outer surface of the ferrule as the collar is being fitted thereon; trapping the plurality of depending legs under the rim of the receptacle, thereby maintaining the coupling of the ferrule with the receptacle; whereby an airtight seal is provided between the dispensing assembly and the receptacle when the collar is positioned over the ferrule and the collar secures the engagement of the legs with the rim of the receptacle.

Accordingly, it is an objective of the present invention to provide an improved dispensing assembly that maximizes the "off-to-on" ratio of application and removal forces of the collar for a given application.

Another objective of the present invention is to provide an improved dispensing assembly that reduces the likelihood that the collar will be accidentally or inadvertently pulled off the ferrule by a user, while also reducing the likelihood of damaging the outer surface thereof during the assembly thereof.

Yet another objective of the present invention is to provide an improved dispensing assembly that effectively compresses the gasket sufficiently to assure a good seal to the bottle neck and avoid leaking while reducing the likelihood of bottle breaking or collapsing.

Still another objective of the present invention is to provide an improved method of assembling such a dispensing assembly that achieves the aforementioned and below mentioned objectives.

Still other objects and advantages of the invention will in part be obvious and will in part be apparent from the specification.

The invention accordingly comprises the features of construction, combination of elements and arrangement of parts and sequence of steps that will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying figures, in which.

Like parts will be identified by like reference numbers in the figures, but not every part will be provided with a reference number, and this should not be construed in a limiting manner.

DETAILED DESCRIPTION OF THE PREFERRED EMBODIMENTS

Figure 2:
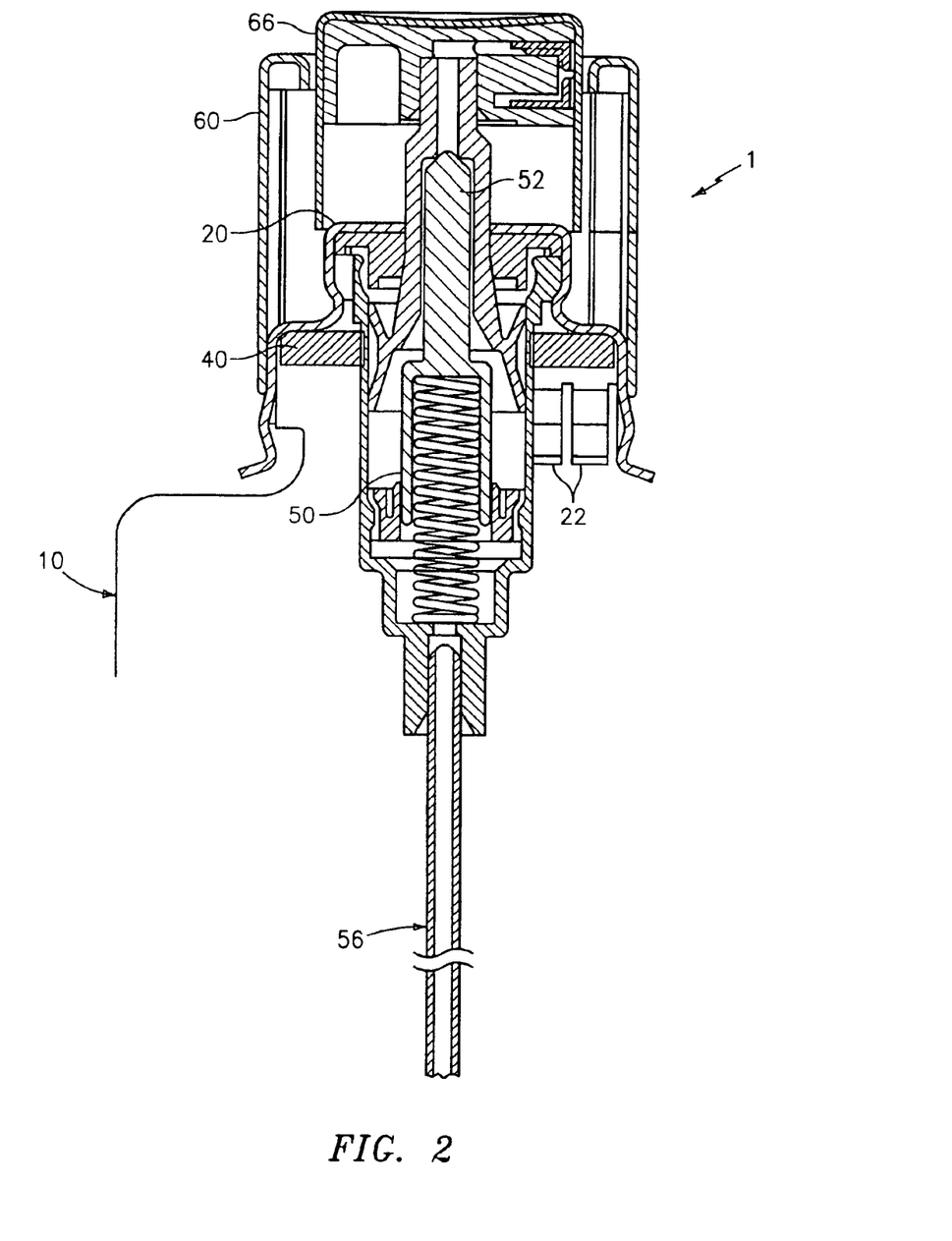
FIG. 2 illustrates a fully assembled dispensing assembly constructed in accordance with the present invention.
Figure 3:
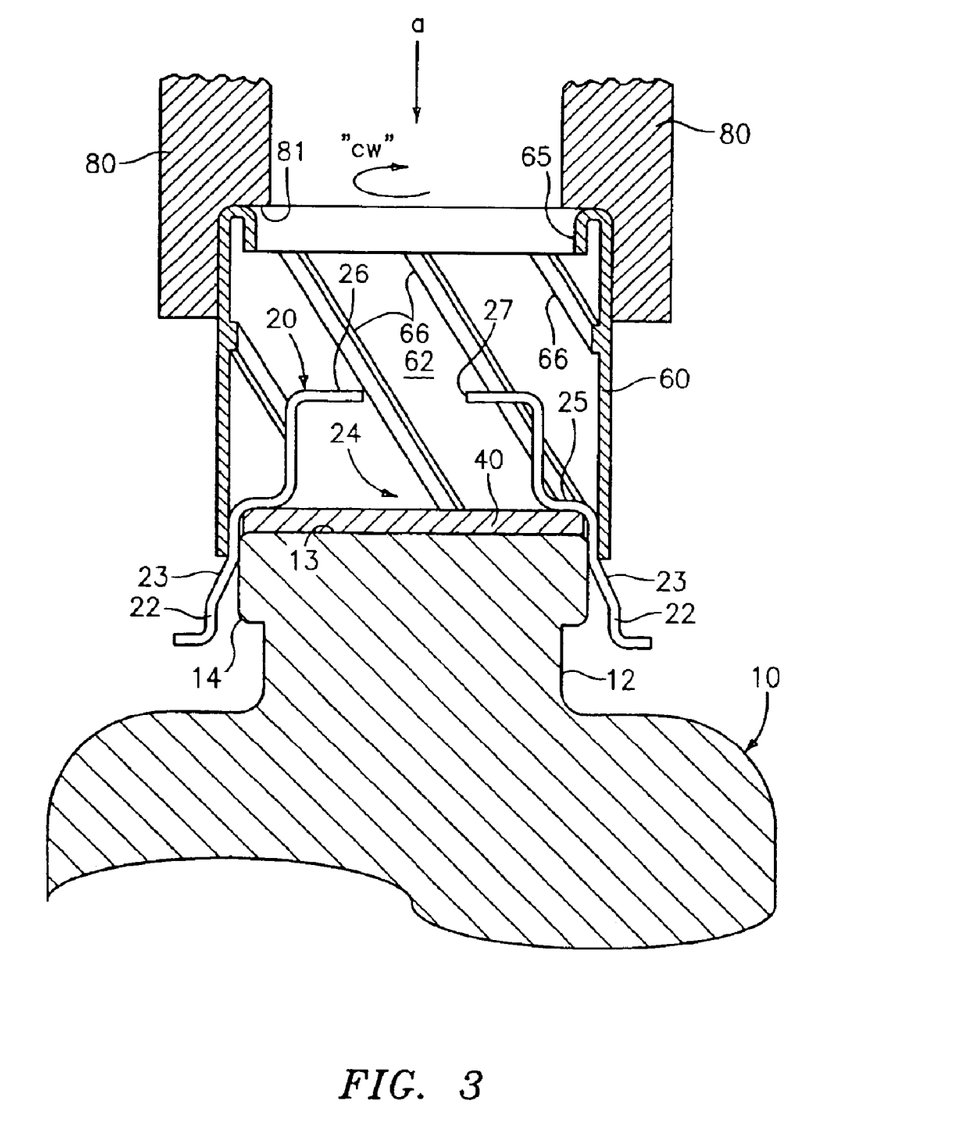
FIG. 3 is a cross sectional view of the dispensing assembly of FIG. 2, with the pump assembly omitted for purposes of brevity.

Reference is first made to FIGS. 2–3, wherein a dispensing assembly, generally indicated at 1, constructed in accordance with the present invention, is disclosed. As should be quickly appreciated, dispensing assembly 1 (hereinafter "assembly 1"), is primarily for dispensing a substance (such as, but not limited to, a liquid such as perfume, cologne or lotion) from a receptacle, generally indicated at 10. In a preferred contemplated embodiment, receptacle 10 is comprised of glass, but one skilled in the art would appreciate that other materials, such as certain types of plastics or ceramics, can be used therefor. Preferably, receptacle 10 includes a neck 12 and a rim 14. Preferably, neck 12 and rim 14 are integrally molded together during the formation of receptacle 10.

Figure 4:
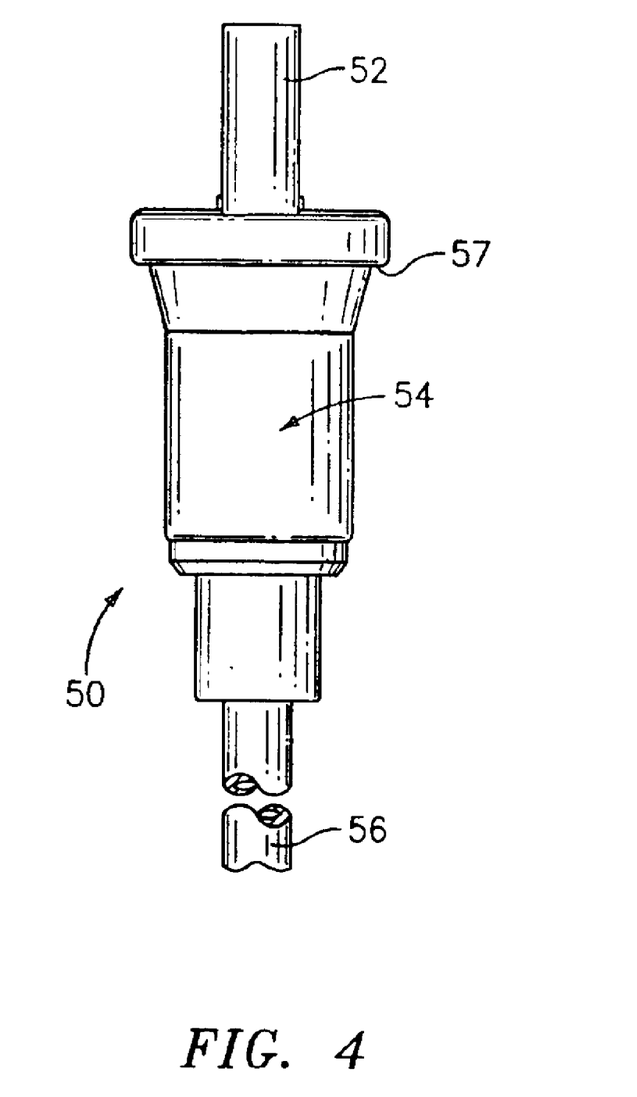
FIG. 4 is a perspective view of a pump assembly used in accordance with the present invention, it being understood to exist in the prior art.

Assembly 1 also comprises a pump assembly, generally indicated at 50 (see FIG. 4). Pump assembly 50, generally known as a module, is well known in the art, and therefore the details of its construction and function can be omitted herein for purposes of brevity. However, at it relates to the particulars of the present invention, it can be seen that pump assembly 50 comprises an exit tube 52 through which the liquid leaves pump assembly 50, an intermediate pumping mechanism and chamber coupled thereto and generally indicated at 54, the construction and function of which is well known in the art, and a dip tube 56, coupled to intermediate pumping mechanism and chamber 54, that extends into receptacle 10 and transports liquid from receptacle 10 towards pumping mechanism and chamber 54.

Assembly 1 also comprises a ferrule, generally indicated at 20. In the preferred embodiment, ferrule 20 is an integrally formed metal member, and is typically formed by conventional stamping and pressing and/or cutting processes all well known. A primary function of ferrule 20 is to maintain a satisfactory coupling of pump assembly 50 to receptacle 10.

Figure 5:
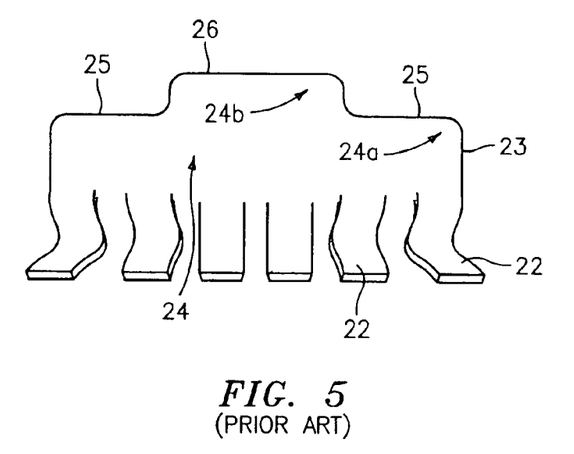
FIG. 5 is a perspective view of a ferrule used in accordance with the present invention, it also being understood to exist in the prior art.

As illustrated, ferrule 20 comprises an outer surface 23 and an interior cavity 24. Preferably, ferrule 20 has a stepped configuration thereby forming two chambers in the interior cavity 24, namely chambers 24a and 24b (see FIG. 5).

Chamber 24a is separated from chamber 24b by an annular flange 25. Chamber 24b is bounded at the top by surface 26 of ferrule 20. Top surface 26 has an aperture 27 through which exit tube 52 of pump assembly 50 extends. Ferrule 20 also has a plurality of bendable and depending legs 22 for engaging rim 14 of receptacle 10 in a manner more fully disclosed below.

As also illustrated assembly 1 includes an annular and preferably resilient gasket 40, positioned in interior cavity 24 and in particular, in chamber 24a and against the inner surface of and in frictional engagement with annular flange 25. Gasket 40 also has an opening through which pumping assembly 50 is positioned. As would be understood, gasket 40 maintains an airtight seal between pumping assembly 50 and receptacle 10 when ferrule 20 is crimped around rim 14 of receptacle 10, as the gasket is positioned intermediate a flange 57 (FIG. 4) of assembly 50 and the top surface 13 of receptacle 10.

Figure 6:
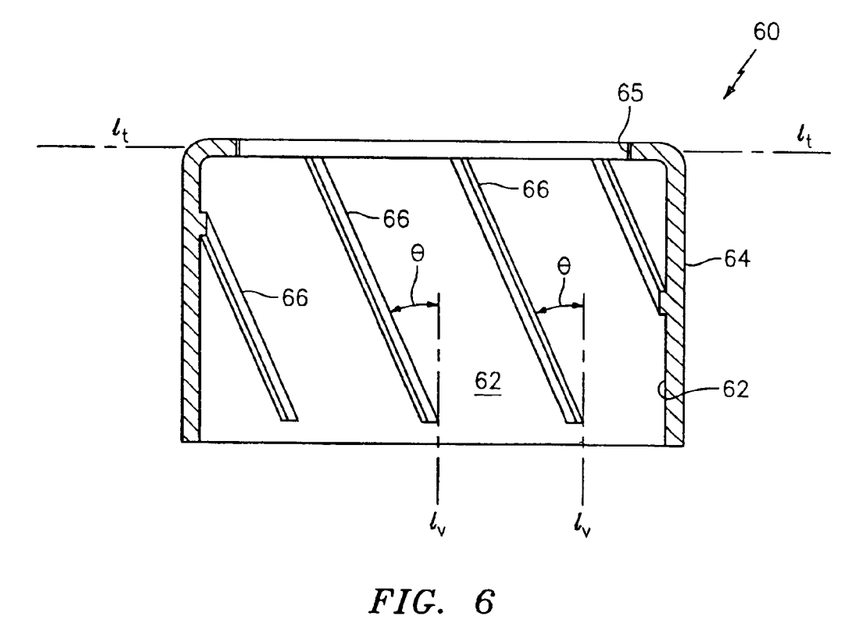
FIG. 6 is a partial cutaway view illustrating a collar constructed in accordance with the present invention.

In accordance with the present invention, an improved collar, generally indicated at 60, and most fully illustrated in FIG. 6, is provided. Specifically, collar 60 is annular, and has an inner surface 62 and an outer surface 64. Collar 60 includes an opening 65 at its top end to receive an actuator button 66 that is mounted on the top of the exit tube 52 of pump assembly 50. The actuator button 66, its construction and operation, as well as its engagement with exit tube 52 so as to disburse liquid, is very well known in the art.

Inner surface 62 comprises outwardly projecting elongated ribs 66 that extend along inner surface 62. Clearly, FIG. 6 illustrates ribs that are angled along the inner surface 62, as opposed to the parallelly aligned (with respect to the longitudinal axis of the collar) ribs of FIG. 1. For reference, ribs 66 are non-orthogonally aligned to a tangent line ("$1_t$") of outer surface 64 of collar 60, or as another frame of reference, non-parallel to a longitudinal axis (see FIG. 8) of the collar. Reference lines "$1_v$" are also provided for purposes of understanding the preferred angling of ribs 66, and should be assumed to be along the inner surface 62 of collar 60. With such a reference, an acceptable angle θ of ribs 66 along the inner surface 62 so as to allow collar 60 to rotate as it is being fitted on ferrule 20 (as discussed below) is approximately ten (10) degrees.

The method of attaching dispensing assembly 1 upon receptacle 10 shall now be disclosed, although it will be assumed that gasket 40 has already been placed around pumping assembly 50 as illustrated, slid up to and against flange 57, with pumping assembly 50 then being positioned on and against the top of receptacle 10 such that the gasket forms the seal between assembly 50 and receptacle 10. Tube 56 extends into the reservoir of receptacle 10. Ferrule 20 is preferably placed on and in a friction or snap-fit with pumping assembly 50 before it is positioned in receptacle 10.

Figure 7:
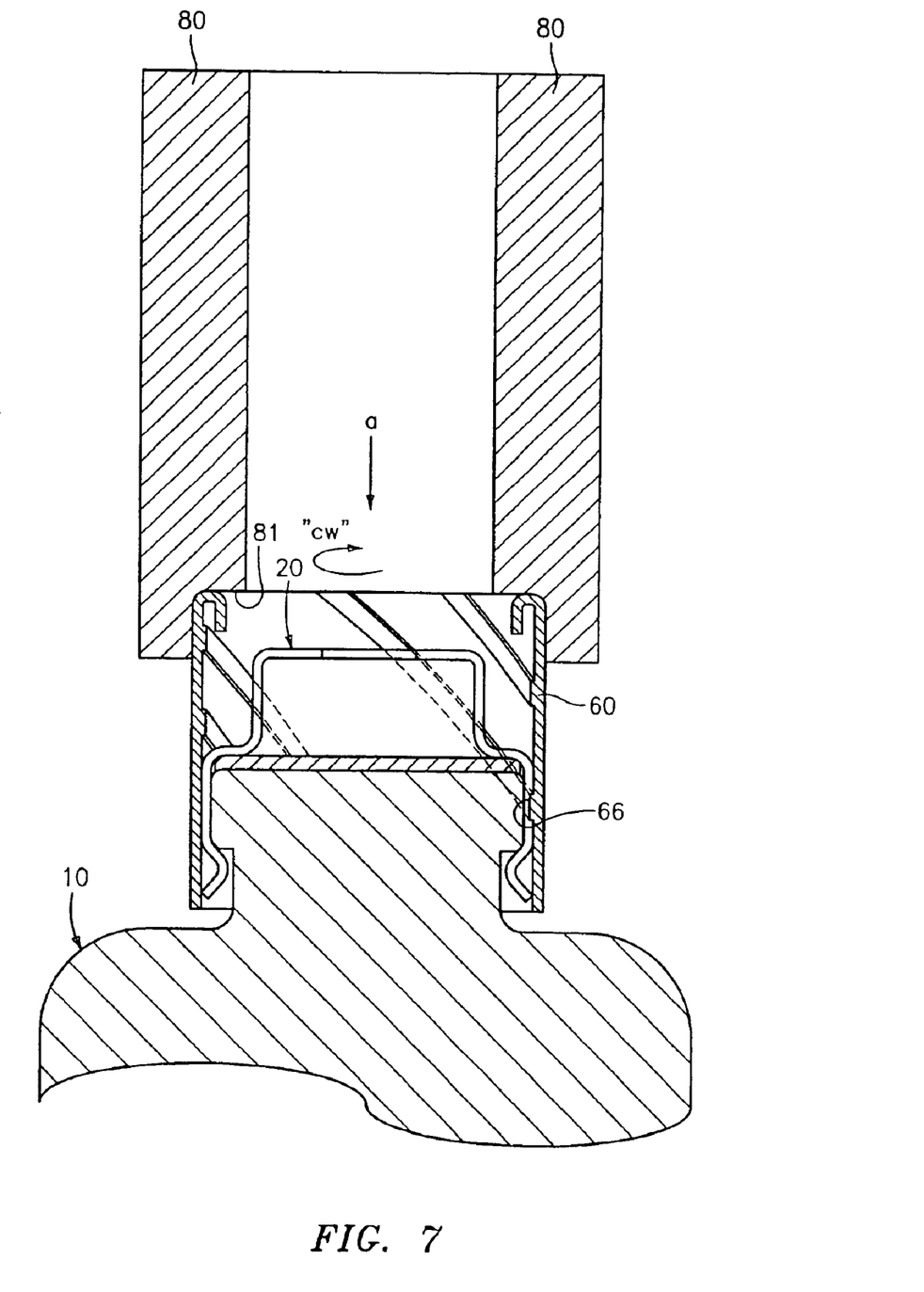
FIG. 7 is a cross sectional view of the dispensing assembly of FIG. 2, again with the pump assembly omitted for purposes of brevity, and illustrating the final position of the collar on the ferrule.

In accordance with the invention, the method of final construction of the dispensing assembly 1 comprises the step of first providing an annular collar such as collar 60 disclosed above, and aligning it so as to be positionable and securable on ferrule 20 (see FIG. 2). Thereafter, the collar 60 is slid downwardly (see arrow "a" (compare position of collar 60 in FIG. 3 to FIG. 7) over the outer surface 23 of ferrule 20 towards receptacle 10. An exemplary press-fit assembly is shown generally at 80 and presses straight down in the direction "a" against collar 60. A flange 81 ensures a good pressing engagement with the top of the collar. Because of the presence and relatively shallow angle of ribs 66, and in combination with a preferable small coefficient of friction between assembly 80 (which may be made of Teflon to ensure a smooth and slippery engagement with the collar) and collar 60 and a preferable high coefficient of friction between the inner surface of ferrule 20 and gasket 40, collar 60 is caused or otherwise allowed to rotate in the clockwise direction (see "CW" arrow of FIG. 7 for ribs angling as illustrated in FIG. 6 (a "CCW" direction for ribs angling from 1:00 to 7:00 o'clock)). In this way, elongated ribs 66 form complementary elongated deformations (i.e. grooves) in outer surface 23 of ferrule 20 as the collar is being fitted onto ferrule 20. That is, and in distinction to that described in U.S. Pat. No. 5,799,810, collar 60 is caused or otherwise allowed to rotate as it is being mounted onto and press-fit downwardly over ferrule 20. Collar 60 is caused to continue its downward and rotational movement along the outer surface of ferrule 20 so as to ensure the trapping of the plurality of depending legs 22 with the rim 14 of the receptacle, thereby maintaining the coupling of the ferrule 20 with the receptacle 10 (FIG. 7). The use of a metal ferrule, such as that made from aluminum, and a conventional gasket provides the desired amount of friction needed therebetween to cause the collar to rotate on the ferrule without the ferrule itself spinning.

Figure 8:
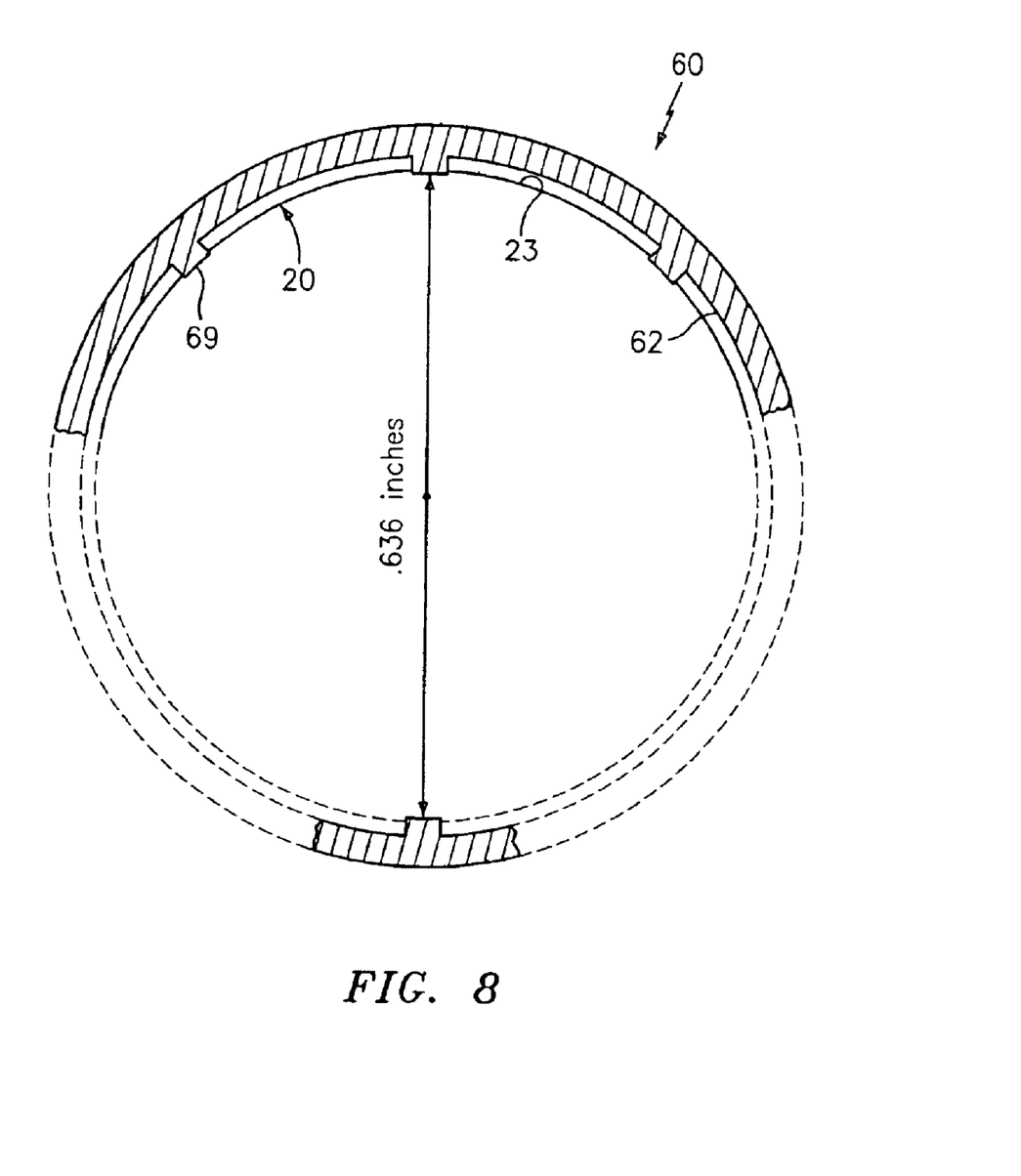
FIG. 8 is a cross sectional slice of the collar of FIG. 6 and the ferrule of FIG. 5 illustrating how the outer diameter of the ferrule is greater than the inner surface of the collar when measured to the inside surface of the ribs of the collar.

In order to provide for the proper friction fit between collar 60 and ferrule 20 and the cutting of permanent grooves in the outer surface 23 thereof, the inside diameter of collar 60 around ribs 66 is less than the diameter of outer surface 23 of ferrule 20 (see FIG. 8). That is, collar 60 is initially prevented from sliding down further over ferrule 20 when an initial force is applied to collar 60. However, an increase in the applied force causes collar 60 to slide and rotate over the outer surface of ferrule 20, ensuring that legs 22 bend downwardly and remain under rim 14 of receptacle 10 (see FIG. 8). Dispenser assembly 50 is then securely held against receptacle 10. The gasket 40 provides sealing.

It should be understood that the continued urging of collar 60 downwardly over ferrule 20 causes ribs 66 to permanently deform the outer surface of the ferrule 20. It can be seen that legs 22 are thus held in their locking position about rim 14, thus ensuring that dispensing assembly 50 will remain adequately fixed in an airtight manner to receptacle 10.

The required force to apply collar 60 securely onto ferrule 20 depends on the shape and size (e.g., radial thickness) of the ribs 66, along with the inherent characteristics of the material comprising collar 60 and ferrule 20 as well as the construction of assembly 80. However, this force needs to be balanced against the resultant force required to remove collar 60 from ferrule 20. Hence, the objective of the present invention is to maximize the ratio of the "off-to-on" force for the needed operation.

As indicated above, it is a requirement that collar 60 rotates on ferrule 20 during the collar's downward securing thereon. It has been found that the force to apply collar 60 on ferrule 20 adheres to the following equation:

$$a = b/\tan X$$

where a=axial force, b=rib resistance force and X=the rib lead angle.

With the dispensing assembly 1 now in place upon receptacle 10, the spiral (or angled) ribs 66 have created angular grooves (see FIG. 7) in ferrule 20 because of the twisting as collar 60 moves downward onto ferrule 20. However, when an axial removal force is now applied to collar 60, the collar resists its removal from ferrule 20 because (a) friction inhibits the ribs 66 from sliding over ferrule 20; (b) collar 60 and ferrule 20 are locked together rotationally, and the engagement of the ferrule 20 with the gasket 40 would require the gasket 40 to spin, which it is resisted from doing because of its compression between the flange 57 and the top surface of receptacle 10, thus producing a resistive torque which impedes removal of collar 60, and (c) the force against the collar 60 (i.e. whether the fingers of a user or a cap) itself impedes rotation of ferrule 20.

It has thus been found that the combined resistance factors set forth above have a pronounced effect on the "off-to-on" ratio. This was proven experimentally, comparing standard collars (i.e. FIG. 1) to the collars constructed in accordance with the present invention, namely collar 60.

Figure 1:
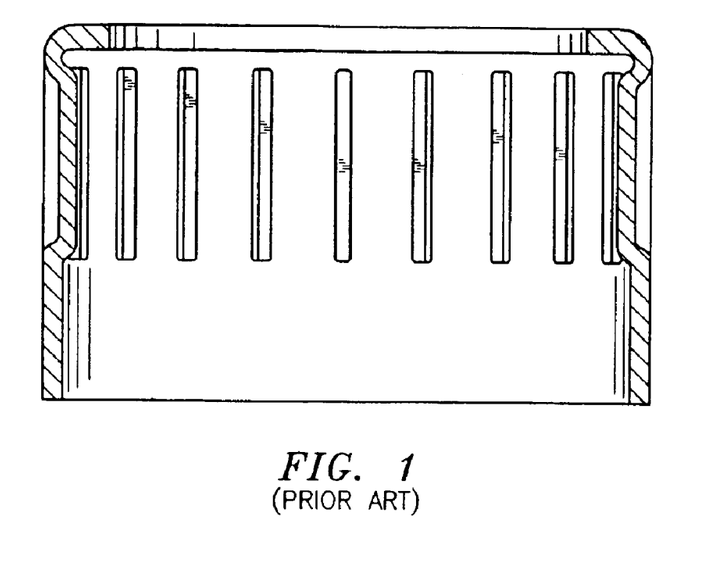
FIG. 1 is a partial cutaway view of a collar constructed in accordance with the prior art.
Figure 1A:
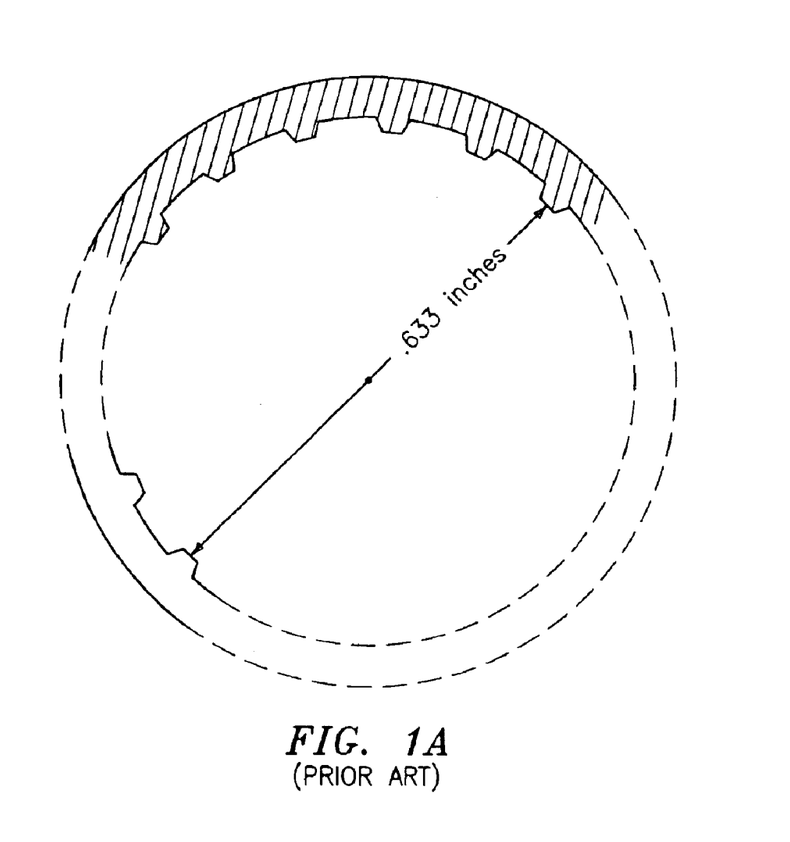
FIG. 1A is a cross-sectional slice of the collar of FIG. 1.

Specifically, the collars constructed in accordance with the present invention were made 0.003 inch larger than that provided by FIG. 1 (when measured from the inner diameter taken from the surface of the respective inner ribs (see FIGS. 1 and 8)), to reduce the friction-fit and to reduce the likelihood of crazing; thus also reducing the application (i.e. "on") force required. Both collars were anodized together and applied to one population of pumps with one population of bottles. The results are as follows:

| Collar Type | Push "On" Force | | Pull-off Force | Failure Mode |
| --- | --- | --- | --- | --- |
| | Primary | Final | | |
| Standard (0.633) | 96 | 142 | 74 | Legs flatten |
| Spiral Rib (0.636) | 57 | 110 | 81 | Legs flatten | where the "primary" force is the force required to first engage the collar to the ferrule, while the "final" force is that which is required to overcome the engagement of the ribs with the outer surface of the ferrule and the other aforementioned resistive factors set forth above.

Based on the foregoing, it can be seen that the "off-to-on" ratio for the collar of the prior art (i.e. FIG. 1) was 52%, while the "off-to-on" ratio for a collar constructed in accordance with the present invention is 74%. Moreover, it was found that the ratio of the "on" forces for the two collars (spiral to standard) is 77%.

Even more advantages can be seen by the observation that while there was evidence of crazing on the standard collars, there was no evidence of crazing on the spiral collars and the torque resistance of the pump assembly 50 secured by ferrule 20 and collar 60 was very satisfactory, thus indicating an adequate seal. Lastly, it was experimentally determined that the retention of the spiral rib collars is 10% greater than on the prior art collars, even though the inner diameter, as measured to the inner surface of the ribs 66 (see FIG. 8) was 0.003 inches greater.

Accordingly, a preferred construction of the present invention is that the inner diameter of the collar, as measured between the inner surfaces 69 of the ribs 66, is 0.636 inches. However, one skilled in the art would readily appreciate that this dimension would change as it is based on the size of the ferrule and the other components. However, what has been disclosed is that a larger collar that that provided in the prior art can be utilized with improved results. Therefore, dimensions set forth herein should not be seen in the limiting, but rather in an illustrative sense.

Accordingly, use of the present invention maximizes the "off-to-on" ratio of a collar for a dispensing assembly for a receptacle as disclosed above. Furthermore, the present invention provides an improved dispensing assembly that reduces the likelihood that the collar will be accidentally or inadvertently pulled off the ferrule by a user, while also reducing the likelihood of damaging the outer surface ("crazing") thereof during the assembly process. The present invention also provides an improved dispensing assembly that effectively compresses the gasket sufficiently to assure a good seal to the bottle neck and avoid leaking while reducing the likelihood of bottle breaking or collapsing.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense. For example, the elongated ribs disclosed herein are linear, but elongated spiraling grooves may also be used to achieve the results and advantages set forth herein.

It is also to be understood that the following claims are intended to cover all of the generic and specific features of the invention described herein and all statements of the scope of the invention that as a matter of language might fall therebetween.

What is claimed is:

1. A dispensing assembly for dispensing a substance from a receptacle, the receptacle comprising a neck and a rim, the dispenser assembly comprising:

pump assembly that comprises at least an exit tube through which the substance leaves the pump assembly, and a dip tube coupled to the exit tube and extending into the receptacle for transporting substance from the receptacle towards the exit tube;

a ferrule for maintaining a coupling of the pump assembly to the receptacle, the ferrule comprising an outer surface and an interior cavity, an aperture through which at least the exit tube of the pump assembly extends, an a plurality of bendable and depending legs for engaging the rim of the receptacle;

a gasket, positioned in the interior cavity of the ferrule and having an opening through which the pumping assembly is positioned, the gasket being in frictional engagement with the ferrule and for at least maintaining an airtight seal between the pumping assembly and the receptacle; and an annular collar, the collar having an inner surface and an outer surface, the inner surface comprising outwardly projecting elongated ribs, the ribs extending along the inner surface thereof and non-orthogonally to a longitudinal axis of the collar;

wherein the ribs are angled along the inner surface of the collar and the frictional engagement between the gasket and the ferrule is sufficient such that:
the collar is caused to rotate along the outer surface of the ferrule as the collar is pressed towards the receptacle; and
the elongated ribs form complementary elongated grooves in the outer surface of the ferrule as the collar is being fitted thereon;

wherein the plurality of depending legs are locked in engagement with the rim of the receptacle to maintain the coupling of the ferrule with the receptacle;

whereby an airtight seal is provided between the dispensing assembly and the receptacle when the collar is positioned over the ferrule and the collar secures the engagement of the legs with the rim of the receptacle.

2. The dispensing assembly as claimed in claim 1, wherein the collar is made of aluminum.

3. The dispensing assembly as claimed in claim 1, wherein each rib forms an angle of approximately 10 degrees with a reference line "$1_v$" on the inner surface of the collar.

4. The dispensing assembly as claimed in claim 1, wherein the ferrule is made of metal.

5. An assembly comprising a receptacle and the dispensing assembly claimed in claim 1.

6. A method of assembling a dispensing assembly upon a rim of a receptacle, wherein the dispensing assembly is for dispensing a substance from the receptacle and comprises (a) a pump assembly that comprises at least an exit tube through which the substance leaves the pump assembly, and a dip tube coupled to the exit tube and extending into the receptacle for transporting the substance from the receptacle towards the exit tube; (b) a ferrule for maintaining a coupling of the pump assembly to the receptacle, the ferrule comprising an outer surface and an interior cavity, an aperture through which at least the exit tube of the pump assembly extends, and a plurality of bendable and depending leg for engaging the rim of the receptacle; (c) a collar having an inner surface and an outer surface, the inner surface comprising outwardly protecting elongated ribs, the ribs extending along the inner surface thereof and being non-orthogonal to longitudinal axis of the collar; and (d) a gasket, positioned in the interior cavity of the ferrule and having an opening through which the pumping assembly is positioned, the gasket being in frictional engagement with the ferrule and for at least maintaining a airtight seal between the pumping assembly and the receptacle, wherein the method comprises:

pushing the collar towards the receptacle and allowing it to rotate over the outer surface of the ferrule as it is forced towards the receptacle and forming elongated grooves in the Outer surface of the ferrule by the elongated ribs as the collar is being fitted thereon;

trapping the plurality of depending legs under the rim of the receptacle, thereby maintaining the coupling of the ferrule with the receptacle;

whereby an airtight seal is provided between the dispensing assembly and the receptacle when the collar is positioned over the ferrule and the collar secures the engagement of the legs with the rim of the receptacle.

7. The method as claimed in claim 6, including the steps of:

providing a fitting assembly against the collar to cause the collar to move downwardly towards the receptacle, and allowing the collar to rotate due to the combination of:
the angle of the ribs;
the coefficient of friction between the gasket and the ferrule; and
the coefficient of friction between the collar and the fitting assembly.

8. The method as claimed in claim 7, wherein:

the angle of the ribs is small enough;

the coefficient of friction between the gasket and the ferrule is large enough; and the coefficient of friction between the collar and the fitting assembly is small enough that:

the fitting assembly imparts no rotational force to the collar as it is pushed towards the receptacle and yet the collar rotates as it pushed onto the ferrule and the ribs cut grooves in the ferrule as the collar moves towards the receptacle.

9. An assembly constructed from the method of claim 6.

10. A method of assembling an assembly comprising a dispensing assembly and a receptacle, wherein the dispensing assembly is for dispensing a substance from the receptacle and comprises (a) a pump assembly that comprises at least an exit tube through which the substance leaves the pump assembly, and a dip tube coupled to the exit tube and extending into the receptacle for transporting the substance from the receptacle towards the exit tube; (b) a ferrule for maintaining a coupling of the pump assembly to the receptacle, the ferrule comprising an outer surface and an interior cavity, an aperture through which at least the exit tube of the pump assembly extends, and a plurality of bendable and depending legs for engaging the rim of the receptacle; (c) a collar having an inner surface and an outer surface, the inner surface comprising outwardly projecting elongated ribs, the ribs extending along the inner surface thereof an being non-orthogonal to a longitudinal axis of the collar; and (d) a gasket, positioned in the interior cavity of the ferrule and having an opening through which the pumping assembly is positioned, the gasket being in frictional engagement with the ferrule and for at least maintaining an airtight seal between the pumping assembly and the receptacle, wherein the method comprises:

pushing the collar towards the receptacle and causing it to rotate over the outer surface of the ferrule as it is forced towards the receptacle and forming elongated grooves in the outer surface of the ferrule by the elongated ribs as the collar is being fitted thereon;

trapping the plurality of depending legs under the rim of the receptacle, thereby maintaining the coupling of the ferrule with the receptacle;

whereby an airtight seal is provided between the dispensing assembly and the receptacle when the collar is positioned over the ferrule and the collar secures the engagement of the legs with the rim of the receptacle.

* * * * *

UNITED STATES PATENT AND TRADEMARK OFFICE
CERTIFICATE OF CORRECTION

PATENT NO. : 6,935,540 B2
DATED : August 30, 2005
INVENTOR(S) : Walter Ackermann

It is certified that error appears in the above-identified patent and that said Letters Patent is hereby corrected as shown below:

Column 8,
Line 37, delete "an" and replace it with -- and --.

Column 9,
Line 27, add -- a -- between "to" and "longitudinal".
Line 31, delete "a" and replace it with -- an --.
Line 37, delete "Outer" and replace it with -- outer --.

Signed and Sealed this

Eighth Day of November, 2005

JON W. DUDAS
*Director of the United States Patent and Trademark Office*